US012620399B2

(12) United States Patent
Cai

(10) Patent No.: US 12,620,399 B2
(45) Date of Patent: May 5, 2026

(54) VOICE PROCESSING METHOD AND APPARATUS, ELECTRONIC DEVICE, AND COMPUTER READABLE MEDIUM

(71) Applicant: BEIJING BYTEDANCE NETWORK TECHNOLOGY CO., LTD., Beijing (CN)

(72) Inventor: Meng Cai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 212 days.

(21) Appl. No.: 18/041,710

(22) PCT Filed: Jul. 29, 2021

(86) PCT No.: PCT/CN2021/109283
§ 371 (c)(1),
(2) Date: Feb. 15, 2023

(87) PCT Pub. No.: WO2022/037383
PCT Pub. Date: Feb. 24, 2022

(65) Prior Publication Data
US 2023/0306979 A1 Sep. 28, 2023

(30) Foreign Application Priority Data
Aug. 17, 2020 (CN) .......................... 202010824772.2

(51) Int. Cl.
*G10L 21/007* (2013.01)
*G10L 15/04* (2013.01)
(Continued)

(52) U.S. Cl.
CPC ............ *G10L 21/007* (2013.01); *G10L 15/04* (2013.01); *G10L 17/02* (2013.01); *G10L 21/0272* (2013.01)

(58) Field of Classification Search
CPC ....... G10L 21/007; G10L 15/04; G10L 17/02; G10L 21/0272
See application file for complete search history.

(56) References Cited

U.S. PATENT DOCUMENTS 9,875,739 B2 * 1/2018 Ziv .......................... G10L 25/51
10,134,401 B2 * 11/2018 Ziv .......................... G10L 17/02
(Continued)

FOREIGN PATENT DOCUMENTS

CN 101000767 A 7/2007
CN 103514884 A 1/2014
(Continued)

OTHER PUBLICATIONS

Zegers, Jeroen, and Hugo Van hamme, "Improving Source Separation via Multi-Speaker Representations", Aug. 2017, Interspeech 2017, pp. 1919-1923. (Year: 2017).*
(Continued)

*Primary Examiner* — Daniel C Washburn
*Assistant Examiner* — James Boggs
(74) *Attorney, Agent, or Firm* — BakerHostetler

(57) ABSTRACT

A voice processing method, comprising: segmenting a voice to be processed into at least one voice segment; generating at least one first voice on the basis of a clustering result of the at least one voice segment; performing feature extraction on each of the at least one first voice, to obtain a voiceprint feature vector corresponding to each first voice; and generating a second voice on the basis of the voiceprint feature vector, the second voice being an unmixed voice of the same sound source. Further disclosed are a voice processing apparatus, an electronic device, and a computer readable medium. By performing feature extraction on the first voice and further performing voice separation on the first voice, a
(Continued)

more accurate second voice is obtained, thereby improving the overall voice segmentation effect.

12 Claims, 5 Drawing Sheets

(51) Int. Cl.
    *G10L 17/02*        (2013.01)
    *G10L 21/0272*    (2013.01)

(56) References Cited

U.S. PATENT DOCUMENTS

| | | | | |
|---|---|---|---|---|
| 10,885,920 | B2 * | 1/2021 | Shoa | G10L 17/06 |
| 11,076,043 | B2 * | 7/2021 | Jolly | G10L 17/00 |
| 11,373,672 | B2 * | 6/2022 | Mesgarani | G10L 25/30 |
| 2006/0248019 | A1 | 11/2006 | Rajakumar | |
| 2014/0142940 | A1 | 5/2014 | Ziv et al. | |
| 2017/0076713 | A1 | 3/2017 | Gildein, II et al. | |

FOREIGN PATENT DOCUMENTS

| | | | |
|---|---|---|---|
| CN | 103530432 A | 1/2014 | |
| CN | 105975569 A | 9/2016 | |
| CN | 105989849 A | 10/2016 | |
| CN | 106056996 A | 10/2016 | |
| CN | 106782545 A | 5/2017 | |
| CN | 107749296 A | 3/2018 | |
| CN | 108198560 A | 6/2018 | |
| CN | 109256137 A | 1/2019 | |
| CN | 109741754 A | 5/2019 | |
| CN | 110164469 A | 8/2019 | |
| CN | 110197665 A | 9/2019 | |
| CN | 110310658 A | 10/2019 | |
| CN | 110335612 A | 10/2019 | |
| CN | 110381389 A | 10/2019 | |
| CN | 110473566 A | 11/2019 | |
| CN | 110675891 A | 1/2020 | |
| CN | 110853615 A | 2/2020 | |
| CN | 110853666 A | 2/2020 | |
| CN | 110930984 A | 3/2020 | |
| CN | 111063342 A | 4/2020 | |
| CN | 111105801 A | 5/2020 | |
| CN | 111128223 A | 5/2020 | |
| CN | 111161710 A | 5/2020 | |
| CN | 111524527 A | 8/2020 | |
| CN | 111968657 A | 11/2020 | |

OTHER PUBLICATIONS

Xu, Chenglin, Wei Rao, Eng Siong Chng, and Haizhou Li, "SpEx: Multi-Scale Time Domain Speaker Extraction Network", May 2020, IEEE/ACM Transactions on Audio, Speech, and Language Processing, vol. 28, pp. 1370-1384. (Year: 2020).*

Shi, Jing, Jiaming Xu, Yusuke Fujita, Shinji Watanabe, and Bo Xu, "Speaker-Conditional Chain Model for Speech Separation and Extraction", Jun. 2020, arXiv preprint arXiv:2006.14149. (Year: 2020).*

Yun, Sungrack, Hye Jin Jang, and Taesu Kim, "Speaker Clustering by Iteratively Finding Discriminative Feature Space and Cluster Labels", Aug. 2017, Interspeech 2017, pp. 2824-2828. (Year: 2017).*

International Patent Application No. PCT/CN2021/109283; Int'l Search Report; dated Nov. 3, 2021; 3 pages.

Hamaidi L.K., et al., "Robust Distributed Sparsity-Constrained Non-Negative Source Separation and Multi-Speaker Voice Activity Detection for Speech Enhancement in Wireless Acoustic Sensor Networks," 2018 International Conference on Signals and Systems (ICSigSys), 2018, pp. 161-166.

International Search Report for International Application No. PCT/CN2021/117199, mailed Dec. 17, 2021, 5 pages.

Written Opinion for International Application No. PCT/CN2021/109283, mailed Nov. 3, 2021, 9 Pages.

Huang Ya-Ting et al.; "Research Advances and Perspectives on the Cocktail Party Problem and Related Auditory Models"; ACTA Automatica Sinica; vol. 45 No. 2; Feb. 2019; p. 234-251 (contains English Abstract).

* cited by examiner

100

To-be-processed speech    102

Clustering result    103

First speech A    First speech B    First speech C    First speech D

Voiceprint vector A    Voiceprint vector B    Voiceprint vector C    Voiceprint vector D Second speech A    Second speech B    Second speech C    Second speech D

101

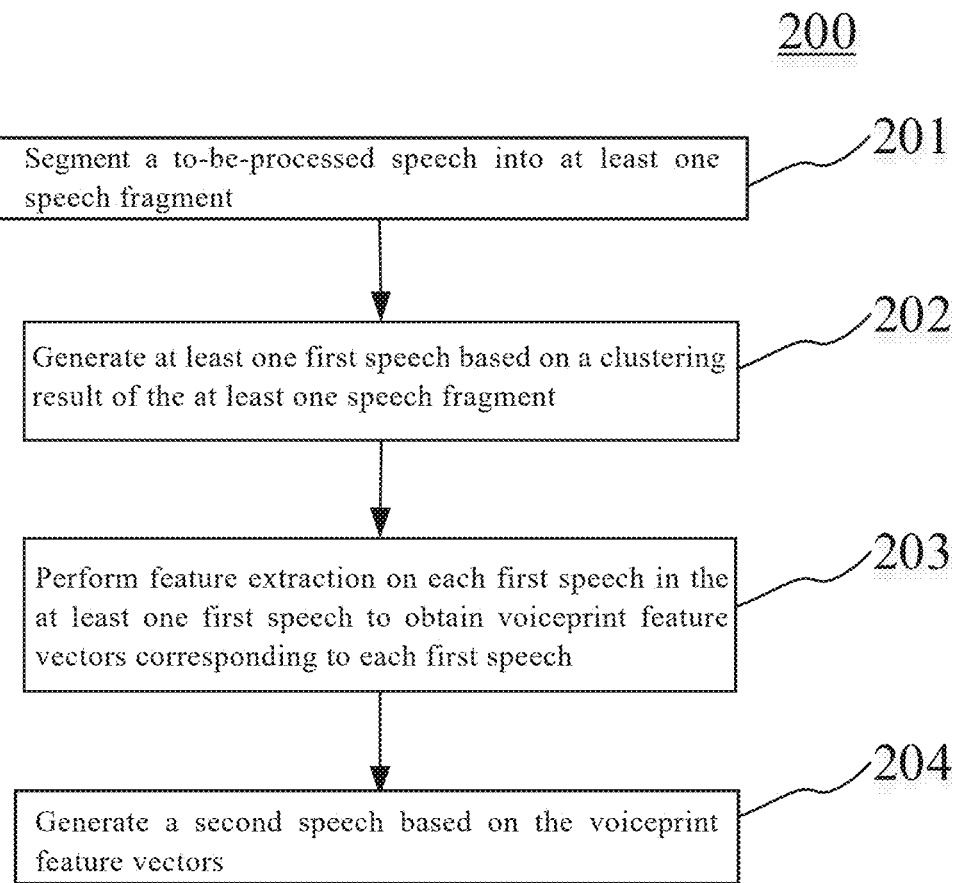

200

Segment a to-be-processed speech into at least one speech fragment ⌇201

Generate at least one first speech based on a clustering result of the at least one speech fragment ⌇202

Perform feature extraction on each first speech in the at least one first speech to obtain voiceprint feature vectors corresponding to each first speech ⌇203

Generate a second speech based on the voiceprint feature vectors ⌇204

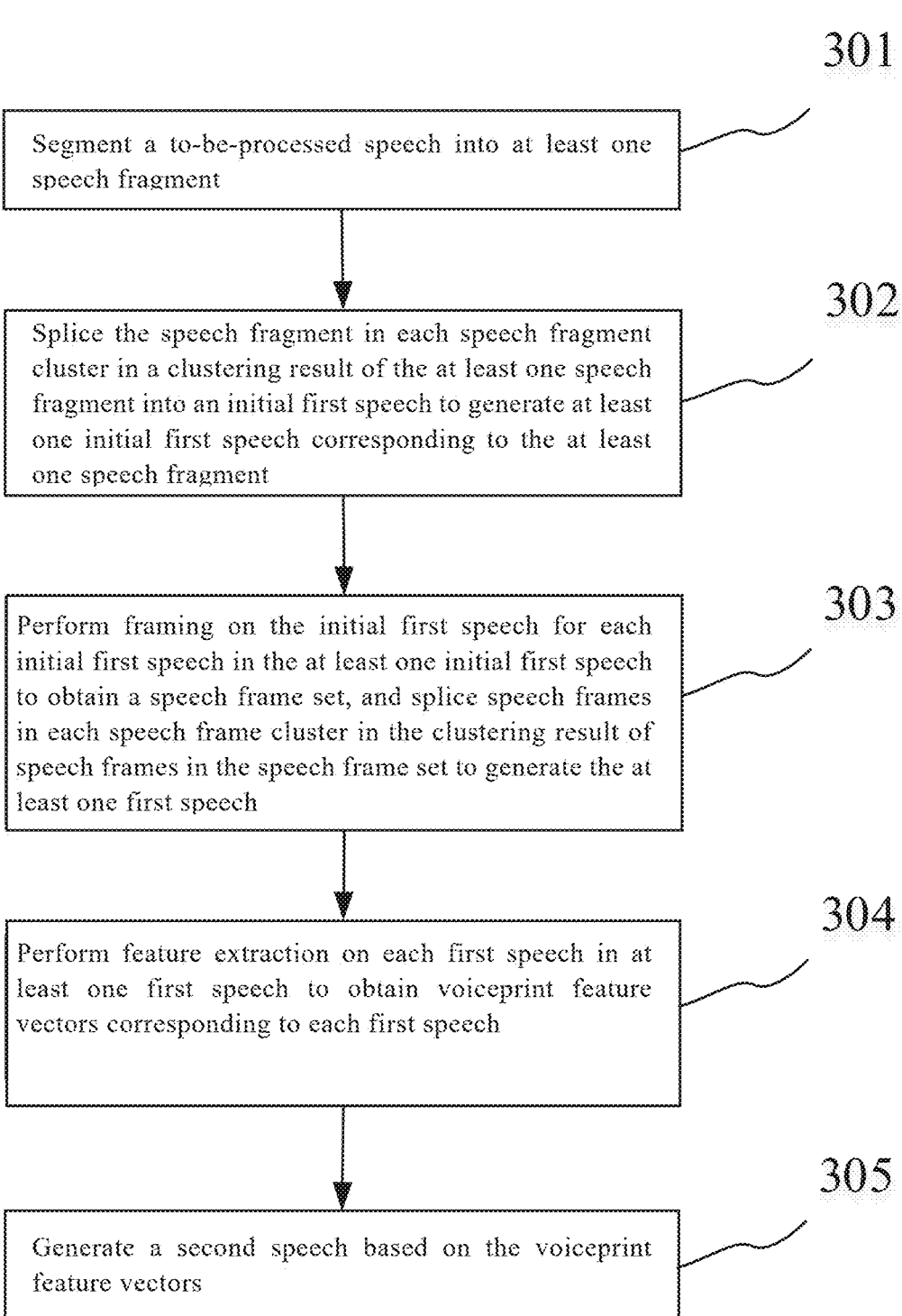

301

Segment a to-be-processed speech into at least one speech fragment

302

Splice the speech fragment in each speech fragment cluster in a clustering result of the at least one speech fragment into an initial first speech to generate at least one initial first speech corresponding to the at least one speech fragment

303

Perform framing on the initial first speech for each initial first speech in the at least one initial first speech to obtain a speech frame set, and splice speech frames in each speech frame cluster in the clustering result of speech frames in the speech frame set to generate the at least one first speech

304

Perform feature extraction on each first speech in at least one first speech to obtain voiceprint feature vectors corresponding to each first speech

305

Generate a second speech based on the voiceprint feature vectors

VOICE PROCESSING METHOD AND APPARATUS, ELECTRONIC DEVICE, AND COMPUTER READABLE MEDIUM

CROSS REFERENCE TO RELATED APPLICATIONS

The present application is the U.S. National Stage of International Application No. PCT/CN2021/109283, filed on Jul. 29, 2021, which claims priority to the Chinese Patent Application No. 202010824772.2, filed to China Patent Office on Aug. 17, 2020, and entitled "VOICE PROCESS-ING METHOD AND APPARATUS, ELECTRONIC DEVICE, AND COMPUTER READABLE MEDIUM", the entire contents of both of which are incorporated herein by reference in their entireties.

FIELD

Embodiments of the present disclosure relate to the tech-nical field of computers, in particular to a speech processing method and apparatus, a device and a computer readable medium.

BACKGROUND

At present, in the process of speech separation, it is often necessary to separate a target speech from a given speech. At present, a related approach can be to adopt a segmentation clustering method to obtain a target speech from a given speech. However, the target speech obtained by adopting the segmentation clustering method is not high in precision rate.

SUMMARY

The content of the present disclosure is used to introduce ideas in a brief form, which will be described in detail in the later specific embodiments. The content of the present disclosure is not intended to identify the key features or necessary features of the technical solution claimed, nor intended to limit the scope of the technical solution claimed.

Some embodiments of the present disclosure propose a speech processing method, device, electronic device and computer-readable media to solve the technical problems mentioned in the above background.

In a first aspect, some embodiments of the present dis-closure provide a speech processing method, comprising: segmenting a to-be-processed speech into at least one speech fragment, wherein the speech fragment is a fragment from beginning to end of a segment of speech of the same sound source; generating at least one first speech based on a clustering result of the at least one speech fragment, wherein the first speech contains at least one speech fragment of the same sound source; performing feature extraction on each first speech in the at least one first speech to obtain a voiceprint feature vector corresponding to each first speech; and generating a second speech based on the voiceprint feature vectors, wherein the second speech is an unmixed speech of the same sound source.

In a second aspect, some embodiments of the present disclosure provide A speech processing apparatus, compris-ing: a segmentation unit configured to segment a to-be-processed speech into at least one speech fragment, wherein the speech fragment is a fragment from beginning to end of a segment of speech of the same sound source; a first generating unit configured to generate at least one first speech based on a clustering result of the at least one speech fragment, wherein the first speech contains at least one speech fragment of the same sound source; a feature extrac-tion unit configured to perform feature extraction on each first speech in the at least one first speech to obtain the voiceprint feature vectors corresponding to each first speech; and a second generating unit configured to generate a second speech based on the voiceprint feature vectors, wherein the second speech is an unmixed speech of the same sound source.

In a third aspect, some embodiments of the present disclosure provide an electronic device, including: one or more processors; and a storage apparatus, one or more programs are stored therein. The one or more programs, when executed by the one or more processors, cause the one or more processors to implement any one of methods in the first aspect.

In a fourth aspect, some embodiments of the present disclosure provide a computer readable medium, computer programs are stored therein. The programs, when executed by a processor, cause the processor to implement any one of the methods in the first aspect.

One embodiment in the above embodiments of the present disclosure has the following beneficial effects: first, a to-be-processed speech is segmented into at least one speech fragment, the above speech fragment being a fragment from beginning to end of a segment of speech of the same sound source; and then, at least one first speech is generated based on a clustering result of the above at least one speech fragment, the above first speech containing at least one speech fragment of the same sound source. Through the above process, a certain precision of speech segmentation may be performed on the target speech, so as to lay a foundation for generating a second speech below. Further-more, feature extraction is performed on each first speech in the above at least one first speech, so as to obtain a voiceprint feature vector corresponding to each first speech; and the second speech is generated based on the above voiceprint feature vector, the second speech being an unmixed speech of the same sound source. The more precise second speech is obtained by performing feature extraction on the above first speech and performing speech separation on the first speech, thereby improving the overall speech segmentation effect.

BRIEF DESCRIPTION OF THE DRAWINGS

The above and other features, advantages and aspects of the embodiments of the present disclosure will become more apparent in combination with the accompanying drawings and with reference to the following specific implementa-tions. Throughout the accompanying drawings, the same or similar reference numerals represent the same or similar elements. It should be understood that the accompanying drawings are schematic and components and elements are not necessarily drawn to scale.

FIG. 2 is a flow diagram of some embodiments of a speech processing method according to the present disclo-sure.

FIG. 3 is a flow diagram of some other embodiments of a speech processing method according to the present dis-closure.

DETAILED DESCRIPTION OF THE EMBODIMENTS

The embodiments of the present disclosure will be described in more detail below with reference to the appended drawings. Although some of the embodiments of the present disclosure are shown in the appended drawings, it should be understood that the disclosure can be implemented in various forms and should not be construed to be limited to the implementations described here. Instead, these implementations are provided for a more thorough and complete understanding of this disclosure. It should be understood that the appended drawings and implementations of the present disclosure are for illustrative purposes only and are not intended to limit the scope of protection of the present disclosure.

It should also be noted that, for ease of description, only the parts related to the invention are shown in the attached drawings. Without conflict, the features of the embodiments and the implementations in this disclosure may be combined with each other.

It is noted that the concepts of "first" and "second" mentioned in the disclosure are used only to distinguish between different devices, modules or units and not to define the order or interdependence of the functions performed by these devices, modules or units.

It is noted that the modifications to "one" and "many" mentioned in the disclosure are schematic and not restrictive, and one in the field should understand that they should be interpreted as "one or more" unless otherwise explicitly stated in the context.

The names of messages or information interacted between multiple devices in the implementation of the present disclosure are used for illustrative purposes only and are not used to limit the scope of these messages or information.

The disclosure will be described in detail below with reference to the appended drawings and in combination with the implementation.

Figure 1:
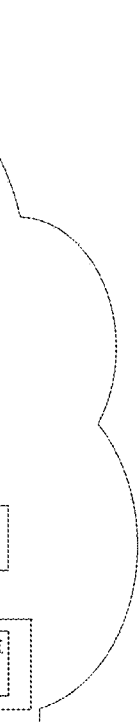
FIG. 1 is a schematic diagram of an application scene of a speech processing method according to some embodi-ments of the present disclosure.

FIG. 1 is a schematic diagram 100 of an application scene of a speech processing method according to some embodiments of the present disclosure.

As shown in diagram 100, an electronic device 101 segments a to-be-processed speech 102 containing a plurality of speakers into nine speech fragments, namely, a fragment 1, a fragment 2, a fragment 3, a fragment 4, a fragment 5, a fragment 6, a fragment 7, a fragment 8 and a fragment 9 in the figure according to a speech start point and a speech end point of a speech of each speaker. Based on a clustering result 103 of the nine speech fragments, four first speeches may be generated, namely, a first speech A, a first speech B, a first speech C and a first speech D in the figure. For each first speech in the four first speeches, voiceprint feature vectors of the first speeches are extracted, so as to obtain four voiceprint feature vectors, namely, a voiceprint feature vector A, a voiceprint feature vector B, a voiceprint feature vector C and a voiceprint feature vector D in the figure. For each voiceprint feature vector in the four voiceprint feature vectors, a second speech corresponding to the voiceprint feature vectors may be generated, namely, a second speech A, a second speech B, a second speech C and a second speech D in the figure.

It should be understood that the speech processing method may be executed by the above electronic device 101. The electronic device 101 may be hardware, or may be software. When the electronic device 101 is the hardware, it may be various electronic devices with the information processing capacity, and includes but not limited to a smart phone, a tablet personnel computer, an eBook reader, a laptop portable computer, a desk computer, a server and the like. When the electronic device 101 is the software, it may be mounted in the above illustrated electronic devices. It may be implemented into a plurality of software or software modules for providing a distributed service, and may also be implemented into single software or a software module, which is not specifically limited here.

It should be understood that the quantity of electronic devices in FIG. 1 is only schematic, according to implementation demands, the electronic devices with any quantity may be provided.

Continuing to refer to FIG. 2, which shows a flow 200 of some embodiments of a speech processing method according to the present disclosure. The speech processing method includes the following steps:

Step 201, a to-be-processed speech is segmented into at least one speech fragment, the speech fragment being a fragment from beginning to end of a segment of speech of the same sound source.

In some embodiments, an executive body (such as the electronic device shown in FIG. 1) of the speech processing method may use various modes to segment a target speech into at least one speech fragment, wherein the to-be-processed speech may be any fragment of speech. During practice, the to-be-processed speech may be a speech including sounds of a plurality of speakers at a meeting.

As an example, the above executive body may adopt speech segmentation software, to segment the to-be-processed speech into at least one speech fragment.

Step 202, based on a clustering result of the above at least one speech fragment, at least one first speech is generated, the above first speech containing at least one speech fragment of the same sound source.

In some embodiments, based on the clustering result of the at least one speech fragment, the above executive body may generate at least one first speech. Here, the clustering result is obtained from the above at least one first speech fragment based on a clustering algorithm. The clustering result may include speech fragments of a plurality of categories. For each speech fragment of each category in the plurality of categories, the first speech may be obtained through various methods. During practice, the speech fragment of the category may be spliced, so as to obtain a first speech. Here, the above clustering algorithm may be one of the following: a K-Means clustering method, a Gaussian mixture clustering method, a mean value drifting clustering method and a density-based clustering method.

In some optional implementations of some embodiments, each first speech in the above at least one first speech includes at least one of the following: the unmixed speech and a mixed speech. The unmixed speech may be a speech spoken by only one person or a speech sound by the same sound source, and the mixed speech may be a speech spoken by a plurality of people at the same time or a speech sound by different sound sources at the same time.

Step 203, feature extraction is performed on each first speech of the above at least one first speech to obtain the voiceprint feature vector corresponding to each first speech.

In some embodiments, for each first speech of the above at least one first speech, the above executive body may use a feature extraction algorithm (for example, a pre-trained deep neural network) to extract the voiceprint feature vector of the first speech, and then obtain the voiceprint feature vector corresponding to the at least one of first speech. During practice, the voiceprint feature vector may be one of the following: a voiceprint vector X-vector and a voiceprint vector I-vector In some optional implementations of some embodiments, the above voiceprint feature vector includes at least one of the following: a voiceprint feature vector corresponding to the unmixed speech and a voiceprint feature vector corresponding to the mixed speech.

Step 204, a second speech is generated based on the above voiceprint feature vector, the above second speech being the unmixed speech of the same sound source.

In some embodiments, for the above voiceprint feature vector, the above executive body may generate the second speech corresponding to the executive body through various methods.

As an example, for the above voiceprint feature vector, the above executive body may input the above voiceprint feature vector into a pre-trained time-domain audio separation network to generate the second speech corresponding to the above voiceprint feature vector. During practice, the voiceprint feature vector is frequently input into the pre-trained time-domain audio separation network to obtain the second speech corresponding to the above voiceprint feature vector, and the above second speech only contains the sound spoken by one person, namely the unmixed speech.

One embodiment in the above embodiments of the present disclosure has the following beneficial effects:

first, the to-be-processed speech is segmented into at least one speech fragment, the above speech fragment being a fragment from beginning to end of a segment of speech of the same sound source; and then, at least one first speech is generated based on the clustering result of the above at least one speech fragment, the above first speech containing at least one speech fragment of the same sound source. Through the above process, a certain precision of speech segmentation may be performed on the target speech, so as to lay a foundation for generating a second speech below. Furthermore, feature extraction is performed on each first speech in the above at least one first speech, so as to obtain the voiceprint feature vector corresponding to each first speech; and the second speech is generated based on the above voiceprint feature vector, the second speech being the unmixed speech of the same sound source. The more precise second speech is obtained by performing feature extraction on the above first speech and performing speech separation on the first speech, thereby improving the overall speech segmentation effect.

Further referring to FIG. 3, which shows a flow 300 of some other embodiments of a speech processing method. The flow 300 of the speech processing method includes the following steps:

Step 301, a target speech is segmented into at least one speech fragment.

In some embodiments, a specific implementation and technical effects of step 301 may refer to step 201 in those corresponding embodiments in FIG. 2, which is not repeated here.

Step 302, a speech fragment of each speech fragment cluster in a clustering result of the above at least one speech fragment is spliced into an initial first speech, to generate at least one initial first speech corresponding to the above at least one speech fragment.

In some embodiments, the above executive body may splice speech fragments of the speech fragment clusters in the clustering result of the above at least one speech fragment to generate a plurality of initial first speeches. Here, the clustering result may include a plurality of clusters. Each speech fragment cluster in the plurality of speech fragment clusters is generated by the clustering algorithm for the above at least one speech fragment. Each speech fragment cluster may include at least one speech fragment. Here, the above clustering algorithm may be one of the following: a K-Means clustering method, a Gaussian mixture clustering method, a mean value drafting clustering method and a density-based clustering method.

Step 303, for each initial first speech in the at least one initial first speech, the above initial first speech is subjected to framing to obtain a speech frame set, and speech frames in each speech frame cluster in the clustering result of the speech frames in the above speech frame set are spliced to generate the above at least one first speech.

In some embodiments, the above executive body may perform framing on the plurality of initial first speeches to obtain the speech frame set. Lengths of the speech frames may be from the beginning to the end of a fragment of speech of the same sound source. The above executive body may splice the speech frames in each cluster in the clustering result of the speech frames in the speech frame set to generate the at least one first speech. During practice, the above executive body may adopt a clustering algorithm for the speech frames in the speech frame set, such as a hidden Markov model (HMM) to obtain a clustering result. The clustering result may include a plurality of speech frame clusters, each speech frame cluster includes a plurality of speech frames, for each speech frame cluster in the plurality of speech frame clusters, the speech frames in the speech frame cluster are spliced, and the plurality of speech frame clusters may generate at least one first speech.

Step 304, feature extraction is performed on each first speech in the at least one first speech to obtain the voiceprint feature vector corresponding to each first speech.

In some embodiments, for each first speech in the above each first speech, the above executive body may use a feature extraction algorithm (for example, a pre-trained deep neural network) to extract the voiceprint feature vector of the first speech, and then obtain the voiceprint feature vector corresponding to the above each first speech. During practice, the voiceprint feature vector may be one of the following: a voiceprint vector X-vector and a voiceprint vector I-vector.

Step 305, the second speech is generated based on the voiceprint feature vector, the above second speech being the unmixed speech of the same sound source.

In some embodiments, for the above voiceprint feature vector, the above executive body may generate the second speech corresponding to the voiceprint feature vector through various methods.

As an example, for the above voiceprint feature vector, the above executive body may input the above voiceprint feature vector into a pre-trained time-domain audio separation network to generate the second speech corresponding to the above voiceprint feature vector. During practice, the voiceprint feature vector is frequently input the pre-trained time-domain audio separation network to obtain the second speech corresponding to the above voiceprint feature vector, and the above second speech only contains the sound spoken by one person, namely the unmixed speech.

In some embodiments, the specific implementation and technical effects of step 305 may refer to step 204 in those corresponding embodiments in FIG. 2, which is not repeated here.

It can be seen from FIG. 3, compared with the description of some corresponding embodiments in FIG. 2, the flow 300 of the speech processing method in some corresponding embodiments in FIG. 3 embodies that the given target speech is segmented and clustered twice, the first segmentation and clustering are performed according to a preset duration, and the second segmentation and clustering are performed according to audio frames. The first speech obtained through twice segmentation and clustering is higher in precision rate. The first speech obtained through twice segmentation and clustering is used for speech separation, thereby greatly improving the precision rate of the second speech through speech separation.

Figure 4:
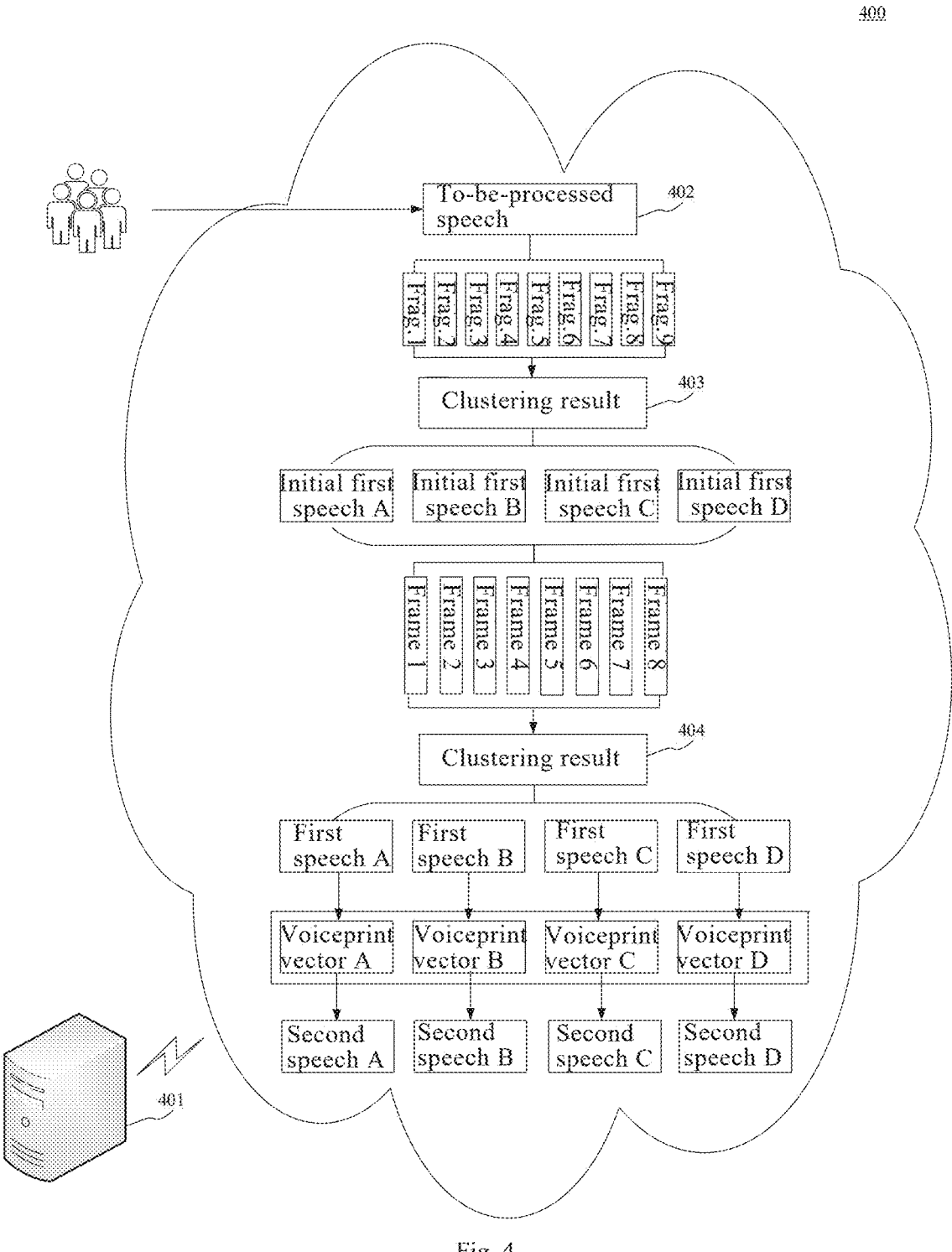
FIG. 4 is a schematic diagram of another application scene of a speech processing method according to some embodiments of the present disclosure.

FIG. 4 is a schematic diagram 400 of another application scene of a speech processing method according to some embodiments of the present disclosure.

As shown in diagram 400, the electronic device 401 segments a to-be-processed speech 402 containing a plurality of speakers into nine speech fragments, namely, a fragment 1, a fragment 2, a fragment 3, a fragment 4, a fragment 5, a fragment 6, a fragment 7, a fragment 8 and a fragment 9 in the figure. Based on a clustering result 403 of the nine speech fragments, four first speeches may be generated, namely, a first speech A, a first speech B, a first speech C and a first speech D in the figure. Then the four initial first speeches may be continued to be segmented according to speech frames to obtain a speech frame set, namely a speech frame 1, a speech frame 2, a speech frame 3, a speech frame 4, a speech frame 5, a speech frame 6, a speech frame 7 and a speech frame 8 in the figure. The speech frames in each cluster in a clustering result 404 of the speech frames in the above speech frame set are spliced to generate at least one first speech, namely, a first speech A, a first speech B, a first speech C and a first speech D in the figure. For each first speech in the four first speeches, voiceprint feature vectors of the first speeches may be extracted, so as to obtain four voiceprint feature vectors, namely, a voiceprint feature vector A, a voiceprint feature vector B, a voiceprint feature vector C and a voiceprint feature vector D in the figure. For each voiceprint feature vector in the four voiceprint feature vectors, second speeches corresponding to the voiceprint feature vectors may be generated, namely, a second speech A, a second speech B, a second speech C and a second speech D in the figure.

Figure 5:
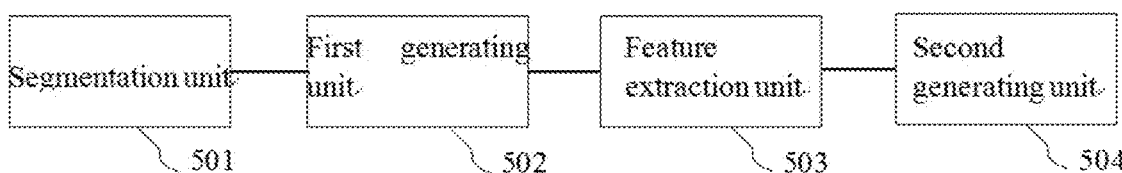
FIG. 5 is a schematic structural diagram of some embodiments of a speech processing apparatus according to the present disclosure.

Continuing to refer to FIG. 5, as the implementation of the methods shown in the above figures, some embodiments of the present disclosure provide a speech processing apparatus, these apparatus embodiments correspond to those method embodiments shown in FIG. 2, and the apparatus may be specifically applied to various electronic devices.

As shown in FIG. 5, a speech processing apparatus 500 of some embodiments includes: a segmentation unit 501, a first generating unit 502, a feature extraction unit 503 and a second generating unit 504. The segmentation unit 501 is configured to segment a to-be-processed speech into at least one speech fragment, the above speech fragment being a fragment from beginning to end of a fragment of speech of the same sound source; the first generating unit 502 is configured to generate at least one first speech based on a clustering result of the above at least one speech fragment, the above first speech containing at least one speech fragment of the same sound source; the feature extraction unit 503 is configured to perform feature extraction on each first speech in the at least one first speech to obtain voiceprint feature vectors corresponding to the first speeches; and the second generating unit 504 is configured to generate second speeches based on the above voiceprint feature vectors, the above second speeches being unmixed speeches of the same sound source.

In some optional implementations of some embodiments, the first generating unit 502 may be further configured to splice speech fragments in the speech fragment clusters in the clustering result of the above at least one speech fragment into first speeches, to generate at least one initial first speech corresponding to the above at least one speech fragment.

In some optional implementations of some embodiments, the first generating unit 502 may be further configured to perform framing on the above initial first speeches for each initial first speech in the at least one initial first speech to obtain a speech frame set, and splice the speech frames in the speech frame clusters in the clustering result of the speech frames in the above speech frame set to generate the at least one first speech.

In some optional implementations of some embodiments, each first speech in the above at least one first speech includes at least one of the following: an unmixed speech and a mixed speech.

In some optional implementations of some embodiments, the voiceprint feature vectors corresponding to the above first speeches include at least one of the following: voiceprint feature vectors corresponding to the unmixed speech and voiceprint feature vectors corresponding to the mixed speech.

In some optional implementations of some embodiments, the second generating unit 504 may be further configured to input the above voiceprint feature vectors into a pre-trained time-domain audio separation network to generate the above second speeches, the above pre-trained time-domain audio separation network being used to generate an unmixed speech of a target sound source according to the voiceprint feature vectors.

It should be understood that units recorded in the apparatus 500 correspond to the steps of the methods described in FIG. 2. Therefore, the operation, features and generated beneficial effects described above for the method also apply to the apparatus 500 and the units contained thereof, which is not repeated here.

Figure 6:
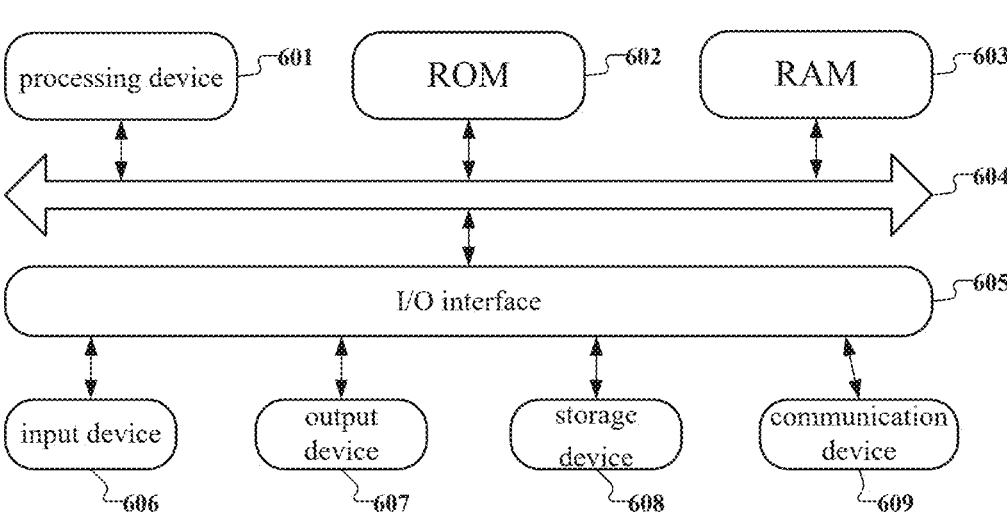
FIG. 6 is a schematic structural diagram of an electronic device suitable for implementing some embodiments of the present disclosure.

Referring to FIG. 6 below, it shows a schematic structural diagram of an electronic device suitable for implementing some embodiments of the present disclosure, such as the electronic device in FIG. 1. The electronic device illustrated in FIG. 6 is only an example and should not impose any restrictions on the functionality and scope of use of the embodiments of this disclosure.

As shown in FIG. 6, an electronic device 600 may include a processing device (eg, a central processing unit, a graphics processor, etc.) 601 that may execute various appropriate actions and processes according to a program stored in a read only memory (ROM) 602 or a program be loaded into random access memory (RAM) 603 from a storage device 608. In the RAM 603, various programs and data necessary for the operation of the electronic device 600 are also stored. The processing device 601, the ROM 602, and the RAM 603 are connected to each other through a bus 604. An input/output (I/O) interface 605 is also connected to the bus 604.

Typically, the following devices can be connected to the I/O interface 605: an input device 606 including, for example, a touch screen, touch pad, keyboard, mouse, etc.; an output device 607 including, for example, a Liquid Crystal Display (LCD), speaker, vibrator, etc.; a storage device 608, including, for example, magnetic tape, hard disk, etc.; and a communication device 609. The communication device 609 may allow electronic device 600 to communicate wirelessly or by wire with other devices to exchange data. Although FIG. 6 shows an electronic device 600 having various devices, it should be understood that not all of the illustrated devices are required to be implemented or provided. More or fewer devices may alternatively be implemented or provided. Each block shown in FIG. 6 can represent one device, and can also represent multiple devices as required.

In particular, according to embodiments of the present application, the processes described above with reference to the flowcharts may be implemented as computer software programs. For example, embodiments of the present application include a computer program product comprising a computer program carried on a computer-readable medium, the computer program containing program code for performing the method illustrated in the flowchart. In such an embodiment, the computer program may be downloaded and installed from the network via the communication device 609, or from the storage device 608, or from the ROM 602. When the computer program is executed by the processing device 601, the above-mentioned functions defined in the methods of the embodiments of the present application are executed.

It should be noted that the computer-readable medium described in the embodiments of the present application may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus or device, or a combination of thereof. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In the embodiments of the present application, a computer-readable storage medium may be any tangible medium that contains or stores a program that can be used by or in conjunction with an instruction execution system, apparatus, or device. While in embodiments of the present application, a computer-readable signal medium may include a data signal in baseband or propagated as part of a carrier wave, carrying computer-readable program code therein. Such propagated data signals may take a variety of forms, including but not limited to electromagnetic signals, optical signals, or any suitable combination thereof. A computer-readable signal medium can also be any computer-readable medium other than a computer-readable storage medium, the computer-readable signal medium can transmit, propagate, or transport the program for use by or in connection with the instruction execution system, apparatus, or device. The program code contained on the computer-readable medium can be transmitted by any suitable medium, including but not limited to: electric wire, optical cable, RF (Radio Frequency, radio frequency), etc., or any suitable combination thereof.

In some embodiments, clients and servers can communicate using any currently known or future network protocol, such as HTTP (HyperText Transfer Protocol), and can be interconnected with any form or medium of digital data communication, such as a communication network. Examples of communication networks include a local area network ("LAN"), a wide area network ("WAN"), an Internet (for example, the Internet), and an end-to-end network (for example, an ad hoc end-to-end network), as well as any network currently known or developed in the future.

The computer-readable medium may be included in the above-mentioned server; or may exist alone without being assembled into the electronic device. The computer-readable medium carries one or more programs, and when the one or more programs are executed by the server, cause the electronic device to: segment a to-be-processed speech into at least one speech fragment, wherein the speech fragment is a fragment from beginning to end of a segment of speech of the same sound source; generate at least one first speech based on a clustering result of the at least one speech fragment, wherein the first speech contains at least one speech fragment of the same sound source; perform feature extraction on each first speech in the at least one first speech to obtain a voiceprint feature vector corresponding to each first speech; and generate a second speech based on the voiceprint feature vectors, wherein the second speech is an unmixed speech of the same sound source.

Computer program code for performing the operations of the embodiments of the present application may be written in one or more programming languages, including object-oriented programming languages—such as Java, Smalltalk, C++, and including conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present application. In this regard, each block in the flowchart or block diagrams may represent a module, program segment, or portion of code that contains one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart, and combinations of blocks in the block diagrams and/or flowchart, can be implemented in dedicated hardware-based systems that perform the specified functions or operations, or can be implemented in a combination of dedicated hardware and computer instructions.

The units involved in the embodiments of the present application may be implemented in a software manner, and may also be implemented in a hardware manner. The described unit may also be provided in the processor, for example, it may be described as: a processor, including a segmentation unit, a first generating unit, a feature extraction unit and a second generating unit. The names of these units do not constitute a limitation of the unit itself under certain circumstances. For example, the segmentation unit may also be described as a unit configured to segment a to-be-processed speech into at least one speech fragment.

The functions described above can be performed at least partially by one or more hardware logic components. For example, unrestricted, the types of hardware logic components that can be used include field programmable gate arrays (FPGA), dedicated integrated circuits (ASIC), dedicated standard products (ASSPs), on-chip systems (SOCs), complex programmable logic devices (CPLDs), and so on.

In accordance with one or more embodiments of the present disclosure, a speech processing method is provided, the speech processing method comprises: segmenting a to-be-processed speech into at least one speech fragment, wherein the speech fragment is a fragment from beginning to end of a segment of speech of the same sound source; generating at least one first speech based on a clustering result of the at least one speech fragment, wherein the first speech contains at least one speech fragment of the same sound source; performing feature extraction on each first speech in the at least one first speech to obtain a voiceprint feature vector corresponding to each first speech; and generating a second speech based on the voiceprint feature vectors, wherein the second speech is an unmixed speech of the same sound source.

In accordance with one or more embodiments of the present disclosure, splicing speech fragments in each speech fragment cluster in the clustering result of the at least one speech fragment into an initial first speech to generate at least one initial first speech corresponding to the at least one speech fragment.

In accordance with one or more embodiments of the present disclosure, performing framing on the initial first speech for each initial first speech in the at least one initial first speech to obtain a speech frame set, and splicing speech frames in each speech frame cluster in the clustering result of the speech frames in the speech frame set to generate the at least one first speech.

In accordance with one or more embodiments of the present disclosure, each first speech in the at least one first speech comprises at least one of the following: the unmixed speech and a mixed speech.

In accordance with one or more embodiments of the present disclosure, the voiceprint feature vector corresponding to the first speech comprises at least one of the following: a voiceprint feature vector corresponding to the unmixed speech and a voiceprint feature vector corresponding to a mixed speech.

In accordance with one or more embodiments of the present disclosure, inputting the voiceprint feature vectors into a pre-trained time-domain audio separation network to generate the second speech, wherein the time-domain audio separation network is used to generate an unmixed speech of a target sound source according to the voiceprint feature vectors.

In accordance with one or more embodiments of the present disclosure, a speech processing apparatus is provided, the speech processing apparatus comprises: a segmentation unit configured to segment a to-be-processed speech into at least one speech fragment, wherein the speech fragment is a fragment from beginning to end of a segment of speech of the same sound source; a first generating unit configured to generate at least one first speech based on a clustering result of the at least one speech fragment, wherein the first speech contains at least one speech fragment of the same sound source; a feature extraction unit configured to perform feature extraction on each first speech in the at least one first speech to obtain the voiceprint feature vectors corresponding to each first speech; and a second generating unit configured to generate a second speech based on the voiceprint feature vectors, wherein the second speech is an unmixed speech of the same sound source.

In accordance with one or more embodiments of the present disclosure, the first generating unit is further configured to splice speech fragments in each speech fragment cluster in the clustering result of the at least one speech fragment into an initial first speech to generate at least one initial first speech corresponding to the at least one speech fragment.

In accordance with one or more embodiments of the present disclosure, the first generating unit is further configured to perform framing on the initial first speech for each initial first speech in the at least one initial first speech to obtain a speech frame set, and splice speech frames in each speech frame cluster in the clustering result of the speech frames in the speech frame set to generate the at least one first speech.

In accordance with one or more embodiments of the present disclosure, each first speech in the at least one first speech comprises at least one of the following: the unmixed speech and a mixed speech.

In accordance with one or more embodiments of the present disclosure, the voiceprint feature vector corresponding to the first speech comprises at least one of the following: a voiceprint feature vector corresponding to the unmixed speech and a voiceprint feature vector corresponding to a mixed speech.

In accordance with one or more embodiments of the present disclosure, the second generating unit is further configured to input the voiceprint feature vectors into a pre-trained time-domain audio separation network to generate the second speech, wherein the time-domain audio separation network is used to generate an unmixed speech of a target sound source according to the voiceprint feature vectors.

In accordance with one or more embodiments of the present disclosure, an electronic device is provided, the electronic device comprises: one or more processors; and a storage apparatus, one or more programs are stored therein. The one or more programs, when executed by the one or more processors, cause the one or more processors to implement any one of methods in the above embodiments.

In accordance with one or more embodiments of the present disclosure, a computer readable medium is provided, computer programs are stored therein. The programs, when executed by a processor, cause the processor to implement any one of the methods in the above embodiments.

The above description is only a preferred embodiment of the present application and an illustration of the applied technical principles. It should be understood by those skilled in the art that the scope of the disclosure involved in the embodiments of the present application is not limited to the technical solution formed by the specific combination of the above technical features, and should also cover, without departing from the above inventive concept, the above Other technical solutions formed by any combination of technical features or their equivalent features. For example, a technical solution is formed by replacing the above features with the technical features disclosed (but not limited to) in the embodiments of the present application with similar functions.

What is claimed is:

1. A speech processing method, comprising:

segmenting a to-be-processed speech into a plurality of speech fragments based on a preset duration;

generating a plurality of initial first speeches based on a result of clustering the plurality of speech fragments, wherein the result comprises a plurality of speech fragment clusters;

generating a plurality of speech frame clusters by performing segmentation and clustering on audio frames in each of the plurality of initial first speeches that are generated based on the result of clustering the plurality of speech fragments of the to-be-processed speech;

generating a plurality of first speeches by splicing speech frames in each of the plurality of speech frame clusters;

performing feature extraction on each first speech in the plurality of first speeches to obtain a voiceprint feature vector corresponding to each first speech; and generating a second speech based on the voiceprint feature vectors, wherein the second speech is an unmixed speech of a same sound source.

2. The method according to claim 1, wherein each first speech in the plurality of first speeches comprises at least one of the unmixed speech and a mixed speech.

3. The method according to claim 1, wherein the voiceprint feature vector corresponding to each first speech comprises at least one of a voiceprint feature vector corresponding to the unmixed speech and a voiceprint feature vector corresponding to a mixed speech.

4. The method according to claim 3, wherein generating the second speech based on the voiceprint feature vectors comprises:

inputting the voiceprint feature vectors into a pre-trained time-domain audio separation network to generate the second speech, wherein the time-domain audio separation network is used to generate an unmixed speech of a target sound source according to the voiceprint feature vectors.

5. An electronic device, comprising:

one or more processors; and a storage apparatus, one or more programs are stored therein, the one or more programs, when executed by the one or more processors, cause the one or more processors to implement operations comprising:

segmenting a to-be-processed speech into a plurality of speech fragments based on a preset duration;

generating a plurality of initial first speeches based on a result of clustering the plurality of speech fragments, wherein the result comprises a plurality of speech fragment clusters;

generating a plurality of speech frame clusters by performing segmentation and clustering on audio frames in each of the plurality of initial first speeches that are generated based on the result of clustering the plurality of speech fragments of the to-be-processed speech;

generating a plurality of first speeches by splicing speech frames in each of the plurality of speech frame clusters;

performing feature extraction on each first speech in the plurality of first speeches to obtain a voiceprint feature vector corresponding to each first speech; and generating a second speech based on the voiceprint feature vectors, wherein the second speech is an unmixed speech of a same sound source.

6. The electronic device according to claim 5, wherein each first speech in the plurality of first speeches comprises at least one of the unmixed speech and a mixed speech.

7. The electronic device according to claim 5, wherein the voiceprint feature vector corresponding to each first speech comprises at least one of a voiceprint feature vector corresponding to the unmixed speech and a voiceprint feature vector corresponding to a mixed speech.

8. The electronic device according to claim 7, wherein generating the second speech based on the voiceprint feature vectors comprises:

inputting the voiceprint feature vectors into a pre-trained time-domain audio separation network to generate the second speech, wherein the time-domain audio separation network is used to generate an unmixed speech of a target sound source according to the voiceprint feature vectors.

9. A non-transitory computer readable medium, computer programs are stored therein, wherein, the programs, when executed by a processor, cause the processor to implement operations comprising:

segmenting a to-be-processed speech into a plurality of speech fragments based on a preset duration;

generating a plurality of initial first speeches based on a result of clustering the plurality of speech fragments, wherein the result comprises a plurality of speech fragment clusters;

generating a plurality of speech frame clusters by performing segmentation and clustering on audio frames in each of the plurality of initial first speeches that are generated based on the result of clustering the plurality of speech fragments of the to-be-processed speech;

generating a plurality of first speeches by splicing speech frames in each of the plurality of speech frame clusters;

performing feature extraction on each first speech in the plurality of first speeches to obtain a voiceprint feature vector corresponding to each first speech; and generating a second speech based on the voiceprint feature vectors, wherein the second speech is an unmixed speech of a same sound source.

10. The non-transitory computer readable medium according to claim 9, wherein each first speech in the plurality of first speeches comprises at least one of the unmixed speech and a mixed speech.

11. The non-transitory computer readable medium according to claim 9, wherein the voiceprint feature vector corresponding to each first speech comprises at least one of the following: a voiceprint feature vector corresponding to the unmixed speech and a voiceprint feature vector corresponding to a mixed speech.

12. The non-transitory computer readable medium according to claim 11, wherein generating the second speech based on the voiceprint feature vectors comprises:

inputting the voiceprint feature vectors into a pre-trained time-domain audio separation network to generate the second speech, wherein the time-domain audio separation network is used to generate an unmixed speech of a target sound source according to the voiceprint feature vectors.

* * * * *